United States Patent
Chiba

Patent Number: 5,277,326
Date of Patent: Jan. 11, 1994

[54] RICE COOKING POT

[76] Inventor: Machiko Chiba, 26-6, Kawadaira 3-chome, Aoba-ku, Sendai-shi, Miyagi, Japan

[21] Appl. No.: 995,003
[22] Filed: Dec. 22, 1992
[51] Int. Cl.⁵ ............................................. B65D 51/16
[52] U.S. Cl. .................................. 220/231; 220/256; 220/324; 220/374; 99/403
[58] Field of Search ............... 220/206, 231, 256, 324, 220/367, 373, 374; 99/401, 403, 410, 411, 412, 413

[56] References Cited

U.S. PATENT DOCUMENTS 2,134,759  11/1938  Howlett ........................ 220/231
4,148,250  4/1979  Miki et al. ...................... 99/403

Primary Examiner—Stephen P. Garbe
Assistant Examiner—Nova Stucker
Attorney, Agent, or Firm—Wenderoth, Lind & Ponack

[57] ABSTRACT

A rice cooking pot for use in cooking rice in a microwave oven has a container having a top opening for holding rice, an inner lid to be put on the container to close the top opening, and an outer lid to be put over the inner lid and press-fitted on the container. The inner lid has its central portion protruding upwardly in the shape of a sheath and is formed with a big center hole extending vertically through the sheath and with small holes provided around the big holes. The inner lid has its top surface sloping downwards toward the small holes.

2 Claims, 4 Drawing Sheets

RICE COOKING POT

BACKGROUND OF THE INVENTION

This invention relates to a rice cooking pot for use in cooking rice in a microwave oven.

A typical prior art rice cooking pot of this type comprises a container body for holding rice, an inner lid for covering the opening of the container and an outer lid to be placed over the inner lid and press-fitted on the container. The inner lid usually has vent holes for venting steam.

Tasty boiled rice is obtainable by cooking rice with a weak heating power at the initial stage, with a strong heating power at the intermediate stage and with a weak heating power again at the last stage. More specifically, in the initial stage of cooking, the heating power should be increased gradually until the entirety of the rice is heated sufficiently with the boiled water circulating through the rice grains. When the entire amount of rice has been heated sufficiently, the heating power is increased to the maximum to promote gelatinization of the rice. When the rice grains expand and turn into a gelatinous, colloidal state wherein no convection of boiled water occurs, the heating power is reduced to allow the boiled rice to settle by its own heat while absorbing water sufficiently.

When cooking rice in a microwave oven, it is preferable to heat rice following the above three stages. But no microwave oven is available to date which can automatically change its output and thus the heating temperature in stages. Also, heating with a microwave oven has a feature in that the material to be heated tends to be heated quickly at its peripheral part and more slowly at the central part thereof.

Thus, when cooking rice in a microwave oven, strong heating power is applied from the beginning because the output of microwave oven is constant. Thus, water begins to boil at the peripheral portion before the entire part of rice is heated sufficiently. Thus, the water content reduces rapidly before the rice is gelatinized sufficiently. Moreover, the rice cannot be gelatinized evenly. Insufficiently gelatinized rice is hard and not tasty.

In order to avoid this problem, it was an ordinary practice to stop heating when the water boils and wait until the heat is distributed evenly over the entire area of rice and then to resume heating. But this is not only troublesome but also has a problem in that when the heating is stopped, the speed at which the rice is gelatinized slows down or the gelatinization stops completely because of the reduced heating temperature. The subsequent reheating cannot gelatinize rice to such a level that is attainable by continuous heating. The rice thus cooked is hard and not tasty.

It is an object of this invention to provide a rice cooking pot which makes it possible to heat rice over the entire part thereof at the initial stage of cooking in a microwave oven.

SUMMARY OF THE INVENTION

In order to solve the above problems, according to the present invention, a rice cooking pot includes an inner lid having a sheath protruding upwardly from a central region of the lid formed with a big center hole which extends vertically through the sheath and small holes provided around the big holes, and having a top surface sloping downwards from the outer periphery thereof toward the small holes.

The inner lid may be further provided with a wall extending vertically from the top surface thereof and encircling the big hole and the small holes. A knob for opening and closing the small holes may be provided.

Rice is put in the container of the rice cooking pot according to this invention and is heated in a microwave oven. As the water in the container boils, steam rises through the big hole into the space between the inner lid and the outer lid, where it is liquefied and drips on the surface of the inner lid. The water then flows on the surface of the inner lid toward the small holes and drops into the container through the small holes. Namely, water circulates back into the container. The water thus returned serves to reduce the temperature of water in the container and thus to prevent the water from boiling sharply at the initial stage of cooking. Also, this serves to prevent the loss of water.

Rice and water held in a container in a microwave oven tend to be heated strongly near the edge of the bottom of the container and more weakly at nearer to the center of the container. Thus, water nearer to the bottom edge portion of the container boils first. Steam originating from the boiling water at the peripheral portion flows toward the big center hole. As the steam flows toward the center of the container, heat is also conducted toward the center. Thus, the interior of the container is heated evenly and the water therein can be boiled evenly. In other words, the rice cooking pot according to this invention can obviate the problem associated with microwave heating, i.e. the problem that is difficult to heat the central part of the container.

Further, since the big hole is formed through the sheath portion which extends vertically upward from the top surface, steam rises in the sheath and is dispersed quickly over the entire top surface of the inner lid. Thus, steam is liquefied quickly while applying uniform pressure to the surface of the inner lid. The liquefied steam returns into the container smoothly. The provision of the vertical wall serves to reduce the leakage of steam and thus the loss of water and to prevent a decline in water temperature.

Thus, with the rice cooking pot according to this invention, rice and water can be heated evenly under suitable pressure for a suitable time period. The rice thus cooked was found to be tasty.

Also, the rice cooker provided with the knob can cook both ordinary rice and glutinous rice. Namely, when cooking ordinary rice, the knob is turned to such a position as to open the small holes so that vaporized water can be returned to the pot. When cooking glutinous rice, it is not necessary to feed vaporized water back into the pot. Thus, the small holes are kept closed by the knob.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 2:
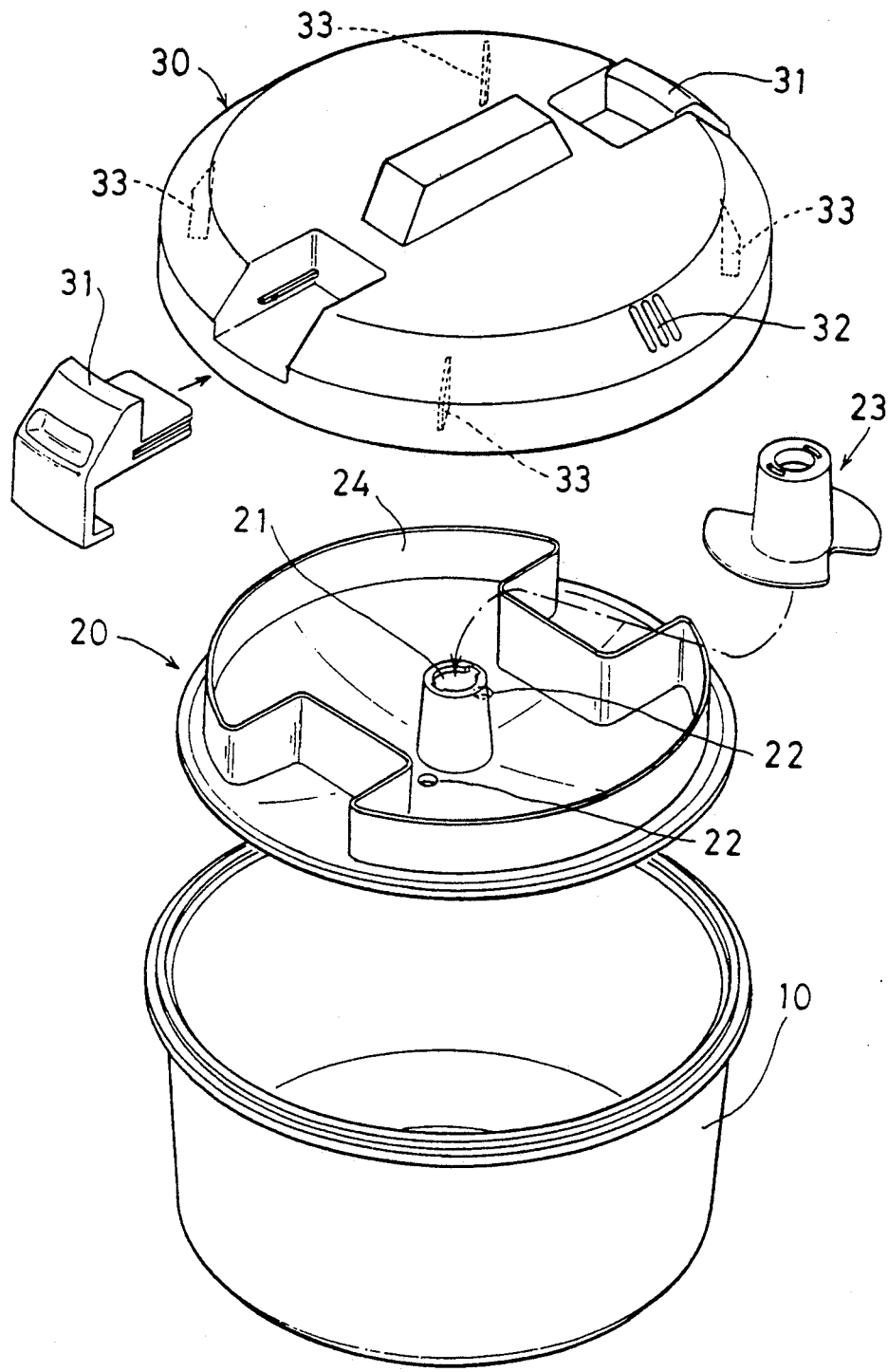
FIG. 2 is an exploded perspective view of the embodiment.

As shown in FIG. 2, this rice cooking pot comprises a container body 10 of 1.38 liter, an inner lid 20 and an outer lid 30. They are thick and all made of a heat-resistant resin such as modified maleimide resin, polypropylene resin or the like. For example, the container 10 may have a thickness of 5.7 mm, while the inner lid 20 may be 3.0 mm thick.

The container 10 has a rib 11 at the bottom thereof, and which serves to keep the bottom surface of the container 10 out of contact with the bottom of the microwave oven (FIG. 1) and thus to prevent the bottom surface of the container 10 from being heated excessively.

The inner lid 20 is plate-shaped and has a big center hole 21 that extends vertically therethrough and pairs of small holes 22 formed around the big hole 21. The big hole 21 and the small holes 22 have sizes which are determined by experiments so that tasty rice can be cooked. In the embodiment, the big hole 21 has a diameter of 16 mm and the small holes 22 each have a diameter of 5 mm. The number and the position of small holes 22 may be determined taking the above factor into consideration.

Figure 3:
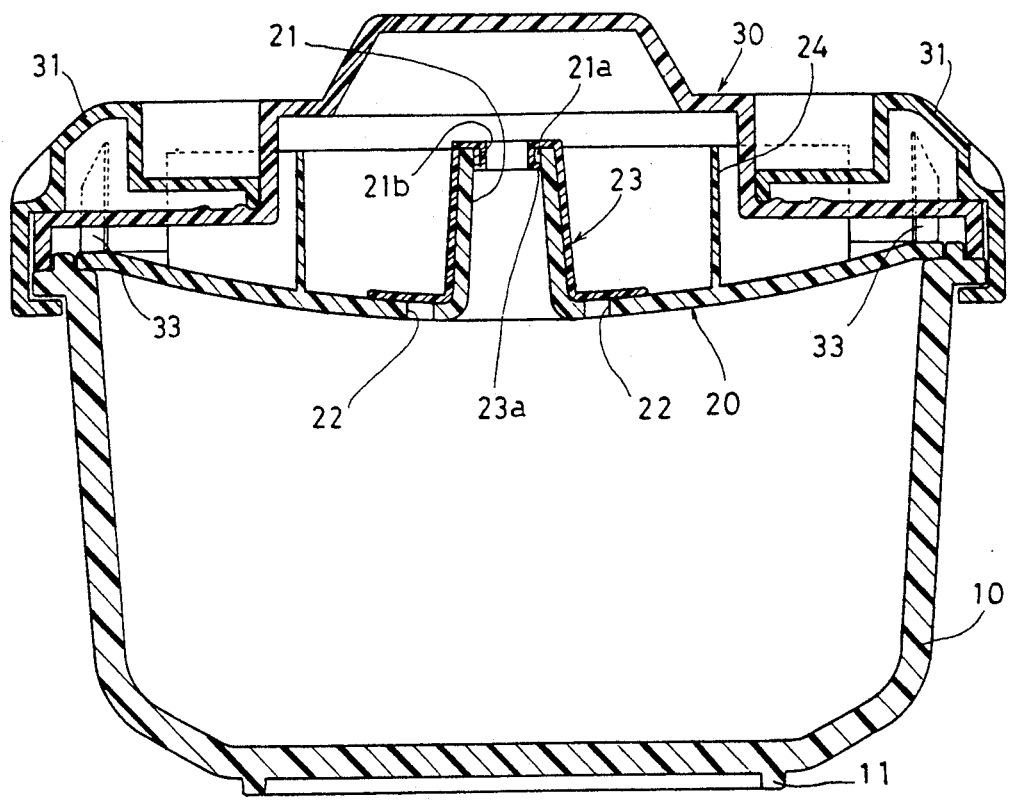
FIG. 3 is a sectional view of the same.
Figure 4:
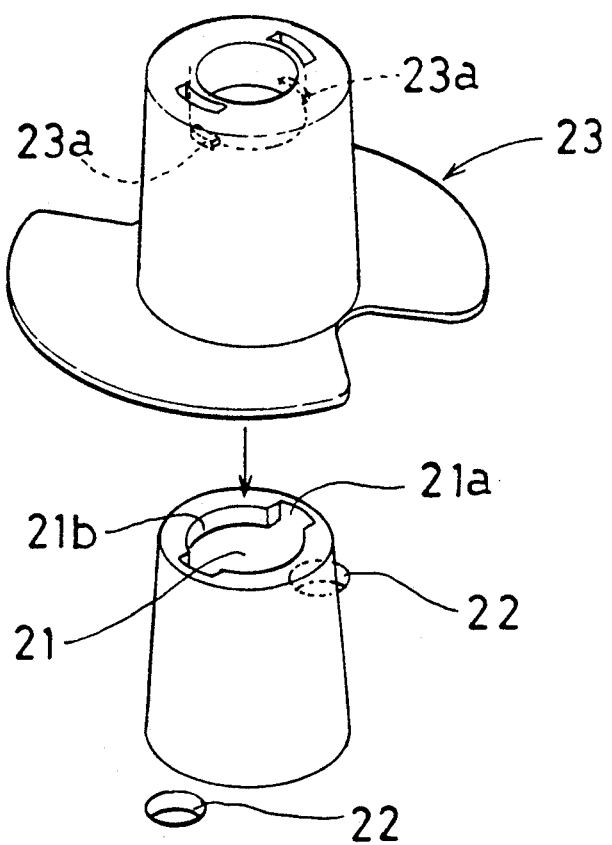
FIG. 4 is a perspective of view of a portion of the same.

An adjusting knob 23 is detachably fitted on the sheath portion forming the big hole 21. By turning this adjusting knob 23, the small holes 22 can be opened and closed. The knob 23 is provided on its inner periphery with claws 23a (FIG. 3). The sheath portion has a rib 21b on the top end thereof, the rib being formed with cutouts 21a. By inserting the claws 23a into the sheath portion through the cutouts 21a and turning them, they will engage the rib 21b, thus preventing the knob 23 from coming off (FIG. 4).

The inner lid 20 has a wall 24 which extends vertically from a top surface thereof around the location where the big hole 21 and the small holes 22 are formed. The vertical wall 24 is provided so that a gap for venting steam is defined between the wall 24 and the inner surface of the outer lid 30 when the outer lid is put on the inner lid 20. The size of the gap should be determined by experiments.

The outer lid 30 is detachably press-fitted, together with the inner lid 20, on the container body 10 by means of a lock lever 31. In the figures, numeral 33 designates an inner lid presser provided on the inner surface of the outer lid 30. The pressure inside the outer lid 30 is maintained constant by means of vent holes 32 formed therein.

We shall explain how to cook rice using this rice cooking pot.

ORDINARY RICE 360 cc of well-rinsed rice a is put in the container 10 together with 2.5 cups (1 cup=180 cc) of water and the inner lid 20 and outer lid 30 are press-fitted to the container by means of the lever 31. The small holes 22 are kept open. The rice is kept soaked in water in this state for 20 minutes.

Figure 1:
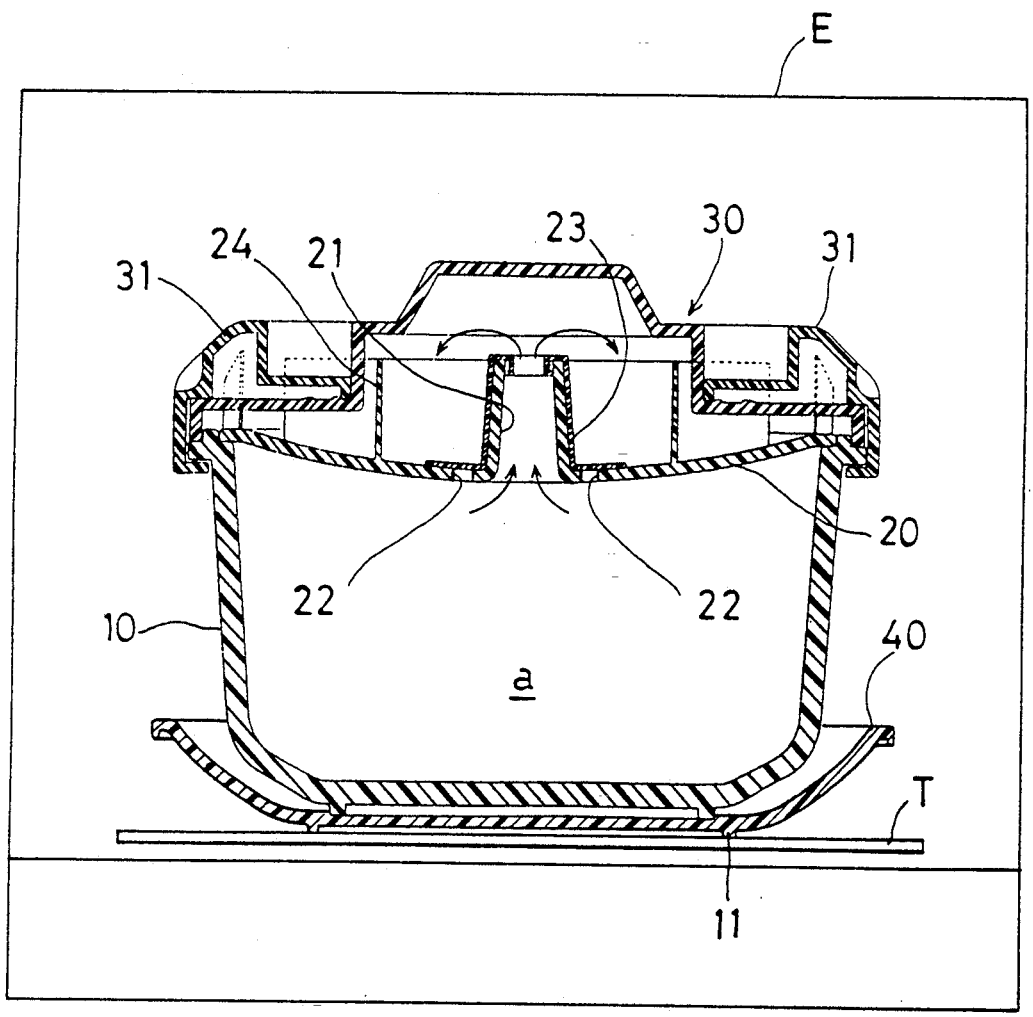
FIG. 1 is a sectional view of the embodiment of the cooking showing it in use.

Then the rice cooking pot is placed on a tray 40 and put in a microwave oven E as shown in FIG. 1. The rice is heated with a strong heating power for 20 minutes. After heating, the rice is kept in this state for 10 minutes to allow the rice to settle by its own heat. The lids are then removed and the cooked rice is stirred gently. In the figure, the letter T designates a turntable in the oven E.

RICE BOILED WITH ADZUKI BEANS i) A quarter cup of adzuki beans is put into the container 10 together with 400 cc of water and baking soda. The inner lid 20 with the small holes 22 closed and the outer lid are press-fitted on the container 10. The rice cooking pot is then put in a microwave oven and heated with high heating power for 10 minutes. After heating, the soup is discarded.

ii) After discarding the soup, 400 cc of lukewarm water is put in the container 10 and the pot is heated for 15 minutes in the same manner as in i). The soup thus obtained is put in another container and cooled completely.

iii) The adzuki beans cooked in the step i) are put in the container 10 together with 380 cc of well-rinsed and well-drained glutinous rice and 2 cups of the cooled-down soup obtained in step ii) and plain water. They are heated for 20 minutes in the same manner as in the step i). After heating, the contents are held in this state for 10 minutes. Then they are stirred up.

PILAF (Materials A) water: 450 cc, soup squares: one and half, butter: a large spoonful, pepper: a little.

(Materials B) green pepper: 1, carrot: ¼, onion: ½, roast ham or bacon: 2 slices.

i) 360 cc of well-rinsed and well-drained rice a is put in the container 10. Then, the materials A are added together with water. They are kept soaked in water for 20 minutes.

(ii) The materials B are diced and put in the container. The inner lid 20 with the small holes 22 closed and the outer lid 30 are press-fitted on the container. The pot is put in the microwave oven E and heated for 20 minutes. After heating, the pot is held in this state for 10 minutes or so. Then the contents are stirred up. If desired, shrimp or the like may be added.

In the above examples, a slightly greater amount of water is used than when cooking rice in a conventional gas or electric rice cooker. This is because microwave cooking generally requires more water than when cooking with any other heating means. More specifically, in order to cook 360 cc of rice, we use 450 cc of water while non-microwave cooking requires 430 cc of water. In order to cook 360 cc of glutinous rice, we use 360 cc of water while non-microwave cooking requires slightly less than 360 cc of water.

The rice cooking pot of the present invention has a sufficient heat retainability. The rice cooked in the container was sufficiently warm and glutinous two hours even after cooking. Further, the rice cooking pot according to this invention can be used for cooking not only ordinary rice but also glutinous rice.

Further, by the provision of the knob 23 with which the small holes 22 can be selectively opened and closed, this rice cooking pot can cook both ordinary rice and glutinous rice. Namely, when cooking ordinary rice, it is necessary to return vaporized water into the pot. Thus, the knob is adjusted to such a position as to open the small holes. When cooking glutinous water, it is not necessary to feed vaporized water back into the pot. Thus, the small holes are kept closed by the knob.

The knob 23 may be constructed so that the degree of opening of the small holes 22 can be adjusted by turning it.

But it may be omitted. In that case, in order that both ordinary rice and glutinous rice can be cooked, two different kinds of inner lids 20 are prepared: one for cooking ordinary rice having the same structure as that shown in FIG. 2 and the other for cooking glutinous rice having no small holes 22.

What is claimed is:

1. A rice cooking pot for use in cooking rice in a microwave oven, said pot comprising: a container having a top opening, an inner lid to be put on said container to close said top opening, an outer lid to be fitted to said container over said inner lid, and a knob rotatably mounted to said inner lid and detachable from said inner lid, said inner lid having a sheath protruding upwardly from a central region thereof, said inner lid having a big center hole extending vertically through said sheath and small holes extending through the inner lid at positions located around said sheath, each of said small holes being smaller than said big hole, said inner lid having a top surface sloping downwards from an outer peripheral portion thereof toward said small holes, rotation of said knob relative to said inner lid adjustably controlling the degree to which said small holes are open.

2. A rice cooking pot as claimed in claim 1, wherein said inner lid includes a wall extending vertically from the top surface thereof and encircling a portion of the inner lid through which said big hole and said small holes extend.

* * * * *